(12) United States Patent
Gerry

(10) Patent No.: US 11,242,698 B2
(45) Date of Patent: Feb. 8, 2022

(54) LOCKING DEVICE

(71) Applicant: Lobster Lock, LLC, San Francisco, CA (US)

(72) Inventor: Benjamin Gerry, San Francisco, CA (US)

(73) Assignee: Lobster Lock, LLC, San Francisco, CA (US)

( * ) Notice: Subject to any disclaimer, the term of this patent is extended or adjusted under 35 U.S.C. 154(b) by 324 days.

(21) Appl. No.: 16/568,042

(22) Filed: Sep. 11, 2019

(65) Prior Publication Data

US 2020/0173199 A1 Jun. 4, 2020

Related U.S. Application Data

(60) Provisional application No. 62/729,997, filed on Sep. 11, 2018.

(51) Int. Cl.
| | |
|---|---|
| *E05B 71/00* | (2006.01) |
| *E05B 15/16* | (2006.01) |
| *E05B 67/28* | (2006.01) |
| *B62J 11/00* | (2020.01) |
| *B62H 5/14* | (2006.01) |

(52) U.S. Cl.
CPC .......... *E05B 71/00* (2013.01); *E05B 15/1614* (2013.01)

(58) Field of Classification Search
CPC ...... E05B 71/00; E05B 15/1614; E05B 67/28; E05B 67/32; B62J 11/00; B62H 5/14; B62H 5/00
USPC .................... 70/14, 18, 30, 49, 58, 227, 233
See application file for complete search history.

(56) References Cited

U.S. PATENT DOCUMENTS

| | | | |
|---|---|---|---|
| 5,065,603 A | 11/1991 | Kloke | |
| 5,475,993 A | 12/1995 | Kuo | |
| 6,820,448 B1 | 11/2004 | Hsieh | |
| 7,712,339 B2 * | 5/2010 | Hentschel | E05B 37/025 70/30 |
| 8,302,436 B2 * | 11/2012 | Cheung | E05B 67/003 70/49 |
| 8,621,898 B2 * | 1/2014 | Chen | E05B 67/003 70/18 |
| 8,881,559 B1 | 11/2014 | Chang | |
| 2011/0154870 A1 * | 6/2011 | Buhl | E05B 67/003 70/233 |
| 2011/0219829 A1 | 9/2011 | Trunek | |
| 2011/0298601 A1 | 12/2011 | Foor | |

(Continued)

FOREIGN PATENT DOCUMENTS

CN 105539643 A 5/2016

*Primary Examiner* — Lloyd A Gall
(74) *Attorney, Agent, or Firm* — DLA Piper LLP (US)

(57) ABSTRACT

A link arm for securing bicycles and other vehicles and their components to each other and to fixed objects such as bike racks and street poles. The link arm is composed of a plurality of elements flexibly joined to each other by cylindrical joints, joined to the bicycle or vehicle by a perpendicularly oriented central hinge, allowing for restricted movement and rotation of other elements in the link arm. The link arm is designed to, when fastened, form a closed loop around the bicycle or vehicle frame, wheel and bike rack. When not in use, the device can be folded into a neat, compact configuration for convenient storage. The central perpendicular hinge enables fast and simple transition between the two states of fastened and in storage.

16 Claims, 16 Drawing Sheets

(56) References Cited

U.S. PATENT DOCUMENTS

| | | |
|---|---|---|
| 2011/0308282 A1 | 12/2011 | Chen |
| 2014/0060126 A1* | 3/2014 | Stevens .................. E05B 67/36 70/18 |
| 2014/0360233 A1* | 12/2014 | Muller .................... E05B 71/00 70/18 |
| 2017/0120977 A1 | 5/2017 | Schaufeld et al. |
| 2018/0105221 A1 | 4/2018 | Gilomme |

* cited by examiner

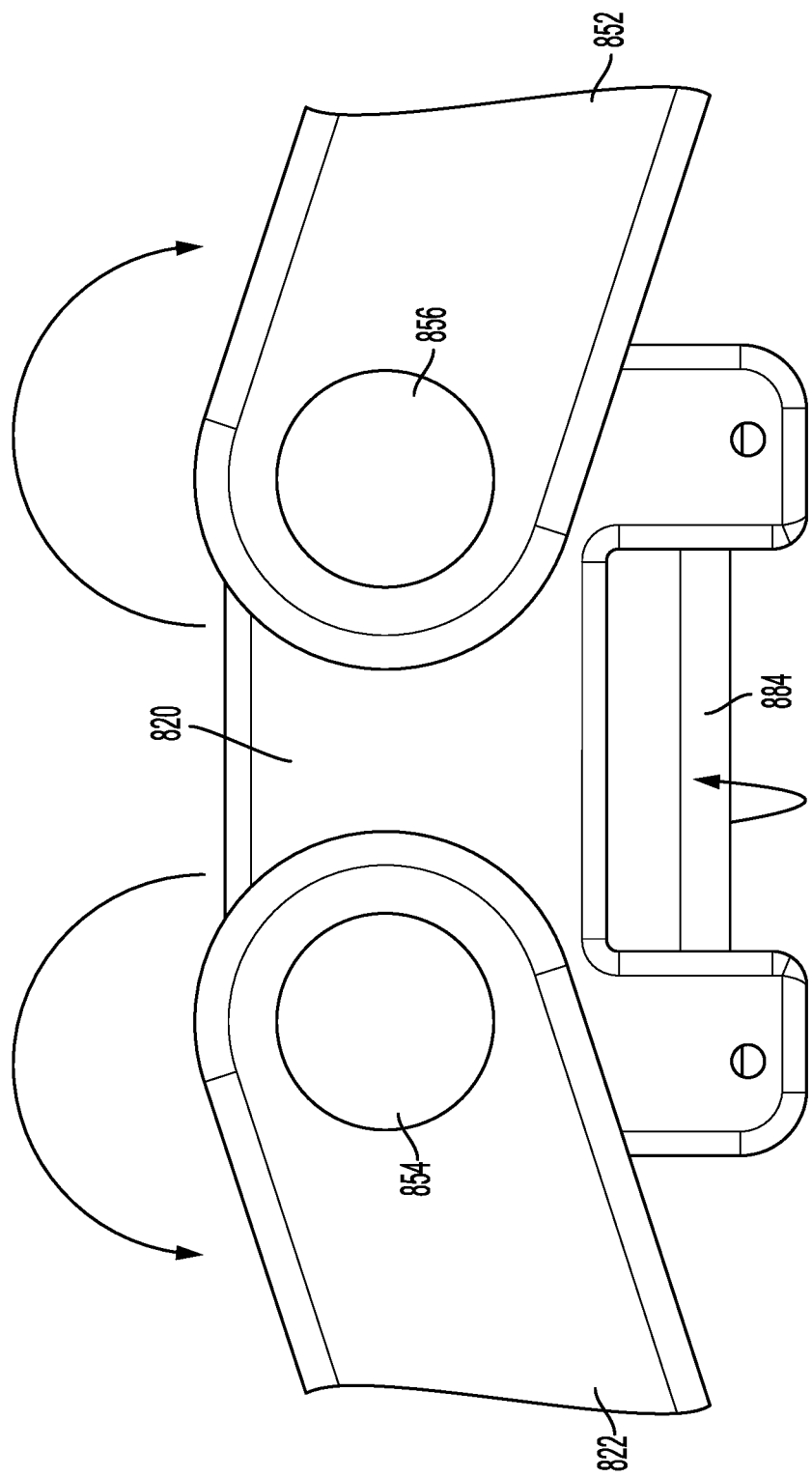

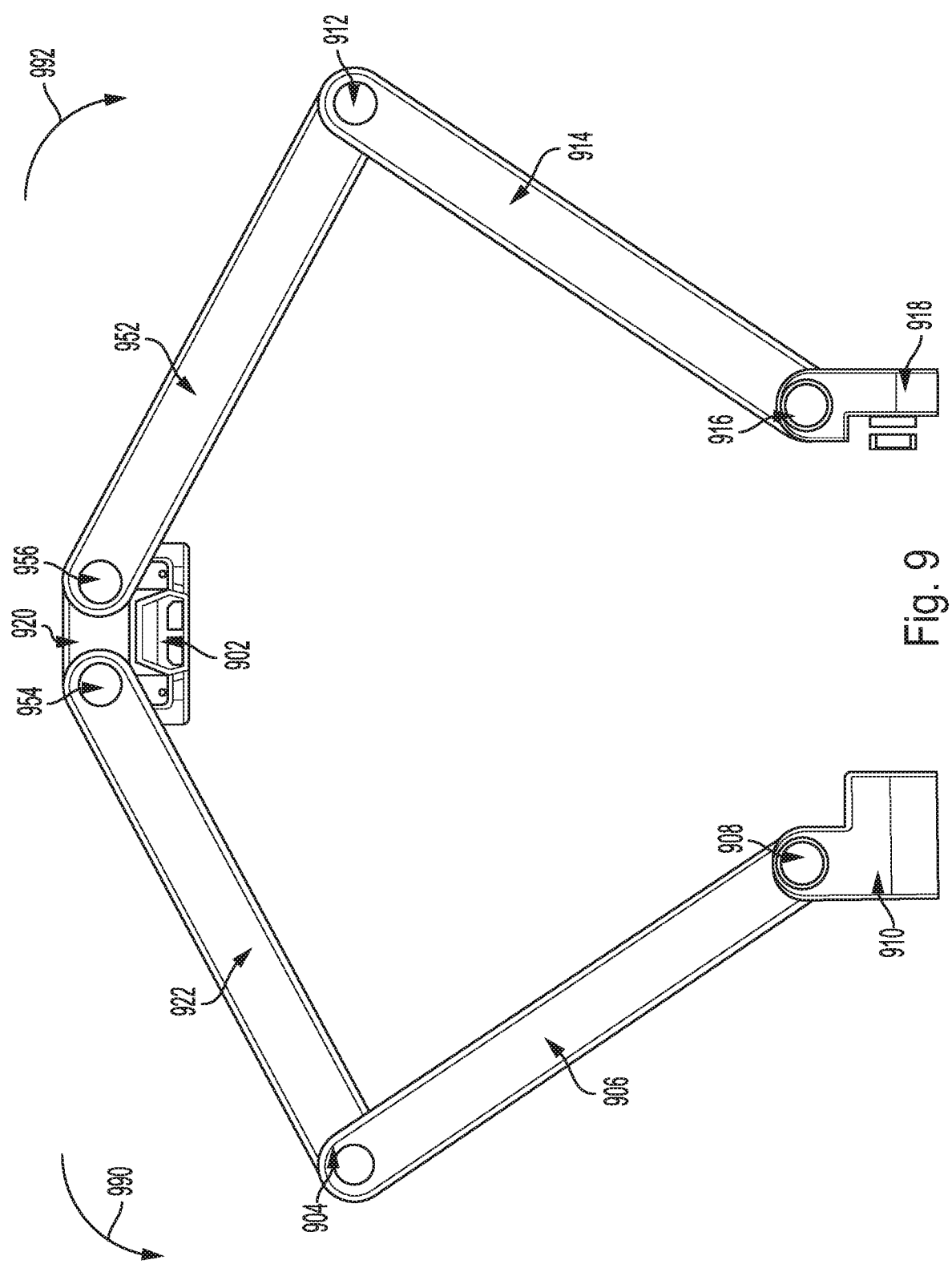

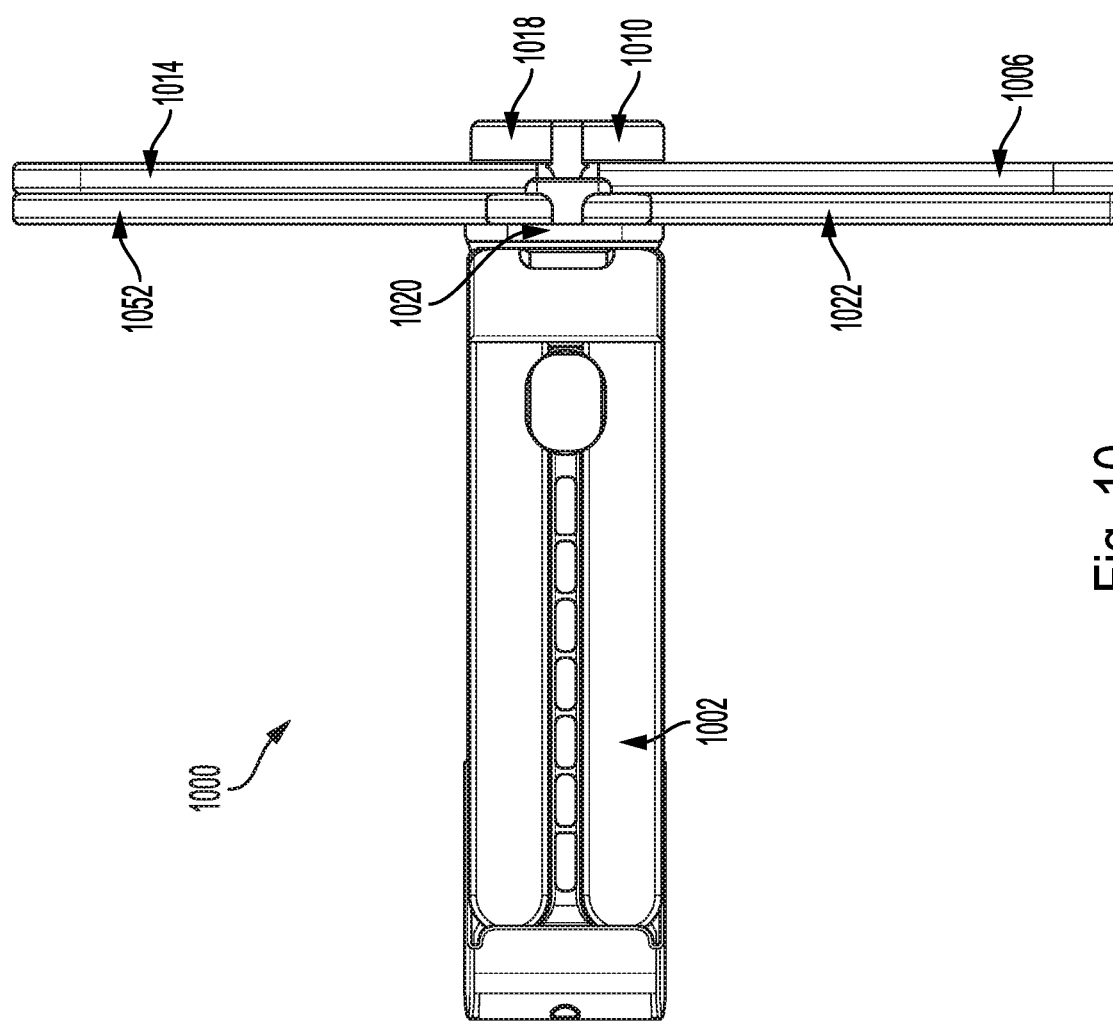

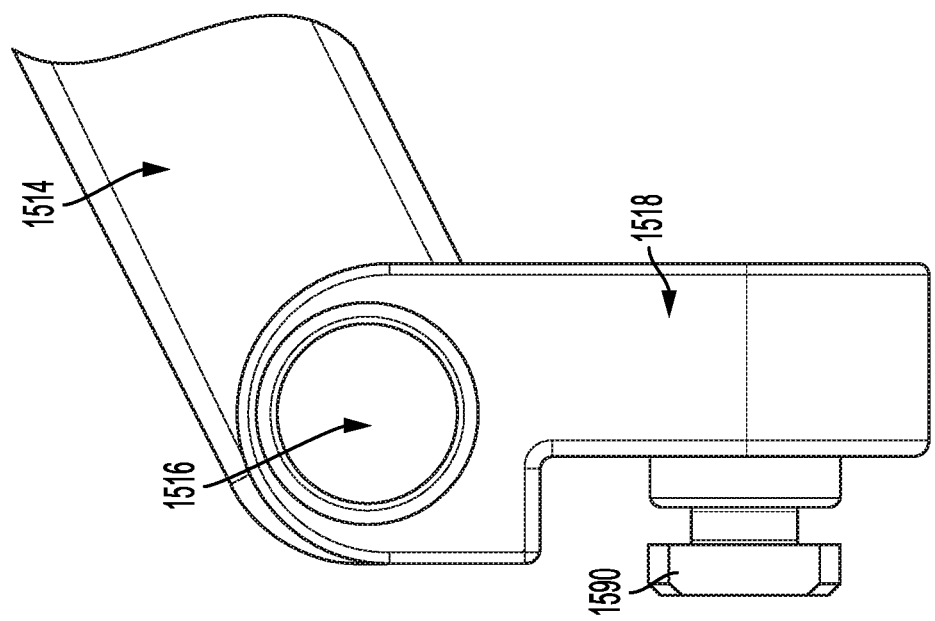
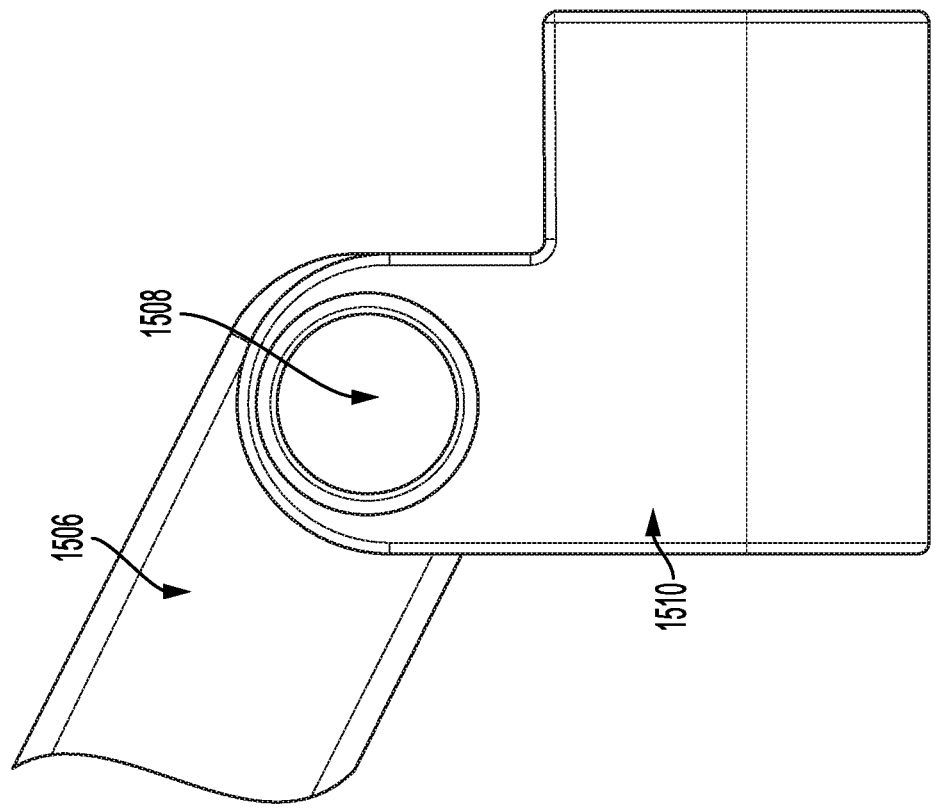
Fig. 15

LOCKING DEVICE

CROSS REFERENCE TO RELATED CASES

This application claims priority to U.S. Provisional patent application No. 62/729,997, filed Sep. 11, 2018, the entirety of which is hereby incorporated by reference.

TECHNICAL FIELD

This application relates to the field of bicycle and other vehicle anti-theft devices, and the components involved in the storage and use of the devices.

BACKGROUND

Previously, conventional anti-theft devices such as U-Locks, cable locks and chains as well as known folding locks suffered from inherently difficult and time consuming locking processes. Also the methods by which riders were asked to mount or carry these locks resulted in discomfort, excessive rattling or shaking while riding, difficulty of use, excessive additional weight while riding, or physically carrying the lock on your person while riding. There exists a need for a locking device that is compactable, easy to mount and stays out of the way when not in use.

SUMMARY

The device comprises of a plurality of elements joined together in a chain via non rigid joints, with a central element being attached to the bicycle or object which is desired to be secured via a hinge perpendicularly oriented relative to the other flexible joints between the elements. The central perpendicular hinge's attachment to the bicycle or object restricts the movement of the other flexibly joined elements of the device, effectively reducing the number of steps and time it takes to transition between the two modes, locked and secured to stored and ready for transit. This hinge also restricts the possible orientations and locations of the other flexibly joined elements of the device, preventing the device from being used improperly and helping to ensure proper locking and securing position to maximally deter theft.

In some example embodiments, what is described is lock system, including a base with a first end and a second end, a central hinge link configured at the first end of the base, two first arms, each of the two first arms including a first end and a second end, the first ends of the two first arms attached to the central hinge link by two respective wing hinges, the two respective wing hinges configured to pivot the two first arms about respective axes, wherein the central hinge link is configured to pivot up, away from the base, around an axis perpendicular to the axes of the two wing hinges of the two first arms, two second arms, each with a first end and a second end, the first ends of the two second arms attached to the two second ends of the first two arms with respective hinges, the two second arm hinges configured to pivot about axes parallel to the axes of the two wing hinges of the two first arms, a two part lock system with one respective component on the second ends of the two second arms, the two part lock system configured to lock together and be unlocked. In some examples, the two part lock mechanism includes an insert lock unit and a receiver lock unit, the insert lock unit attached to the second end of one of the two second arms, the receiver lock unit attached to the second end of the other of the two second arms, wherein the insert lock unit and the receiver lock unit are configured to couple together to lock and unlock. In some examples, the two first arm ends are configured to be able to pivot the first two arms back so the second ends of the first two arms approach the second end of the base forming a compact stowed system. In some examples, the central hinge link includes a central hinge bar, the central hinge bar forming the axis around which the central hinge link pivots about the base. In some examples, the link arms and central hinge link are made of steel or titanium. In some examples, the link arms are generally flat. In some examples, the two part lock mechanisms are each attached to the two second ends of the respective two second arms by a hinge. In some examples, the base configured to attach to a bicycle frame. In some examples, the base, link arms, and central hinge bar are made of steel or titanium.

Some example embodiments described here include, a lock system, including, a base bar with a top, bottom, first end and second end, the bottom of the base bar including an attachment mechanism, the first end of the base bar including a central link with two wing hinges, two link arms, each with a first end and a second end, the respective first ends of the two link arms extending from the two wing hinges, wherein the central link includes a central hinge configured to pivot about the base bar about an axis perpendicular to the direction of axes of the two link arm two wing hinges, two lock portions configured at the respective second ends of each of the two link arms, the two lock portions configured to lock and unlock with each another. In some example embodiments, the two link arms each include a second link arm connected to the two link arms, each by a respective hinge configured to allow the two second link arms to pivot about axes parallel to the axes of the two link arm two wing hinges. In some example embodiments, the base attachment mechanism includes two screws configured to attach to a vehicle frame. In some example embodiments, the two lock portions include one male and one female side, wherein the two lock portions are configured to couple together to lock and unlock with a key.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

FIG. 8a is an example detail of the central perpendicular hinge pivoted to its locking orientation, according to embodiments described herein.

FIG. 9 is an example front view of the flexibly joined elements unfolded, unfastened, unattached to a bike or object with the central perpendicular hinge pivoted to its locking orientation, according to embodiments described herein.

FIG. 10 is an example top view of the flexibly joined elements unfolded, fastened, unattached to a bike or object with the central perpendicular hinge pivoted to its locking orientation, according to embodiments described herein.

FIG. 15 is an example detail of the lock mechanism at the ends of the link arms, according to embodiments described herein.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the invention to these particular embodiments. In other instances, well-known structures, procedures, and components have not been described in detail so as not to unnecessarily obscure aspects of the embodiments of the invention(s).

Overview

Anyone who has ever ridden a personal vehicle such as a bicycle knows the importance of securing or otherwise locking that vehicle up when in storage, even if that storage is for a few minutes. It is therefore useful to have a locking device which can secure such a vehicle to an immovable object like a rack, or even to secure component parts to itself and to render it impossible to operate, when locked. Even more useful would be a locking device that can be easily stored to such a vehicle eliminating the cumbersome transportation of the locking device, which can be heavy and bulky if it is to resist vandalism and tampering. Even more useful would be a locking device that can remain mounted to the vehicle when in locking and storage mode, to reduce the time needed to employ it and store it. The examples described herein include embodiments of the locking device that may be mounted to a vehicle. In such a way, the device provides the ability to securely store the locking device, employ it quickly, and safely secure the vehicle components to itself, and/or to an immovable rack.

It should be noted that the use of the term "bicycle" or "bike" are merely examples and are not intended to be limiting in any way. The embodiments described herein may be mounted to and used to lock any number of vehicles or other devices such as but not limited to: bicycles, tricycles, powered scooters, motorcycles, powered bicycles, foot scooters, skateboards, or any other kind of personal vehicle, or other device.

Folded Device Examples

Figure 1:
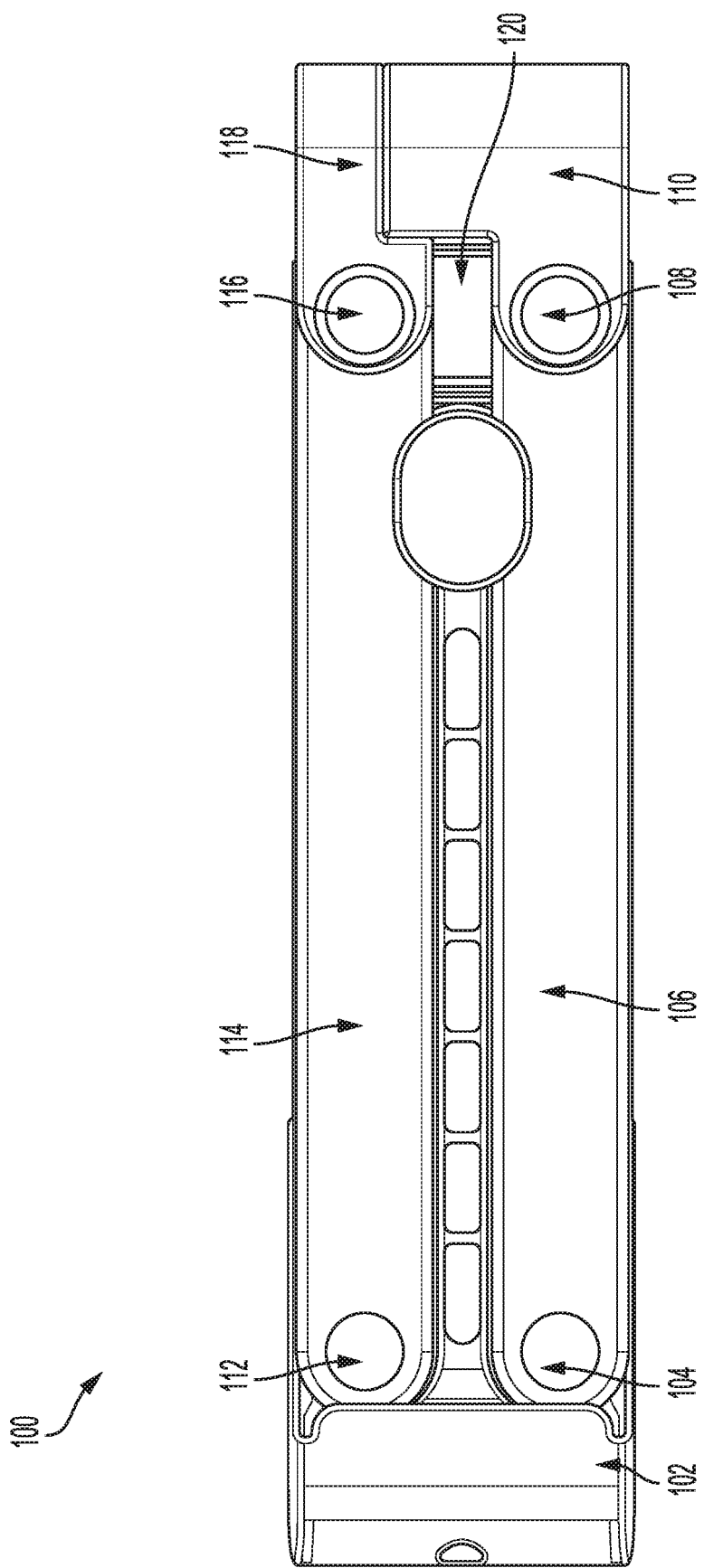
FIG. 1 is an example top, plan view of the device disclosed in its fully folded-up storage and transit mode, unattached to a bike or object, according to embodiments described herein.

FIG. 1 shows an example top down view of the device 100 in its fully folded-up storage and transit mode, unattached to a bike or other object. In such a way, the device takes up minimal space, and can be attached to a vehicle for ease of transport without interference of the vehicle operation.

In the example of FIG. 1, the two fastening ends 110, 118 are shown clasped together; each one is flexibly joined to link arm elements 106, 114 via rivet or other hinge 108, 116 allowing for angular rotational movement of the fastening ends 110, 118 relative to link arm elements 106, 114. Example link arm elements 106, 114 may be flexibly joined to link arm elements not visible in this view via rivet or other hinge 104, 102 allowing for angular rotational movement of the link arm elements 106, 114 relative to link arm elements not visible in this view, located directly link arm elements 106, 114. In some examples, directly beneath fastening ends 110, 118 is a small part of central link 120.

In some example embodiments, all of the elements specified above fit snugly into the base 102 in the shown positions and orientation. To allow for this position, the width of the base 102 could be at least twice the width of the link arm elements 114 and 106. This configuration would allow for the device to be folded and stored in a compact manner while the user is riding the bike (not shown in FIG. 1, see FIGS. 3, 4). When in this arrangement, the user can comfortably and easily ride a bicycle without interference from the device.

The component parts such as the link arms 106, 114, the base 102, could be made of various materials that are strong and resist breakage. Such materials may include but are not limited to stainless steel, steel, hardened steel, cast iron, fiberglass, carbon fiber, titanium, aluminum, ceramics, composites, polymers, polymers with carbon fiber, 3D printed metal alloys or any other material that is strong and rigid. The material may be coated in powder coating, paint, lacquer, or other hard resin for durability and/or rust resistance.

Figure 2:
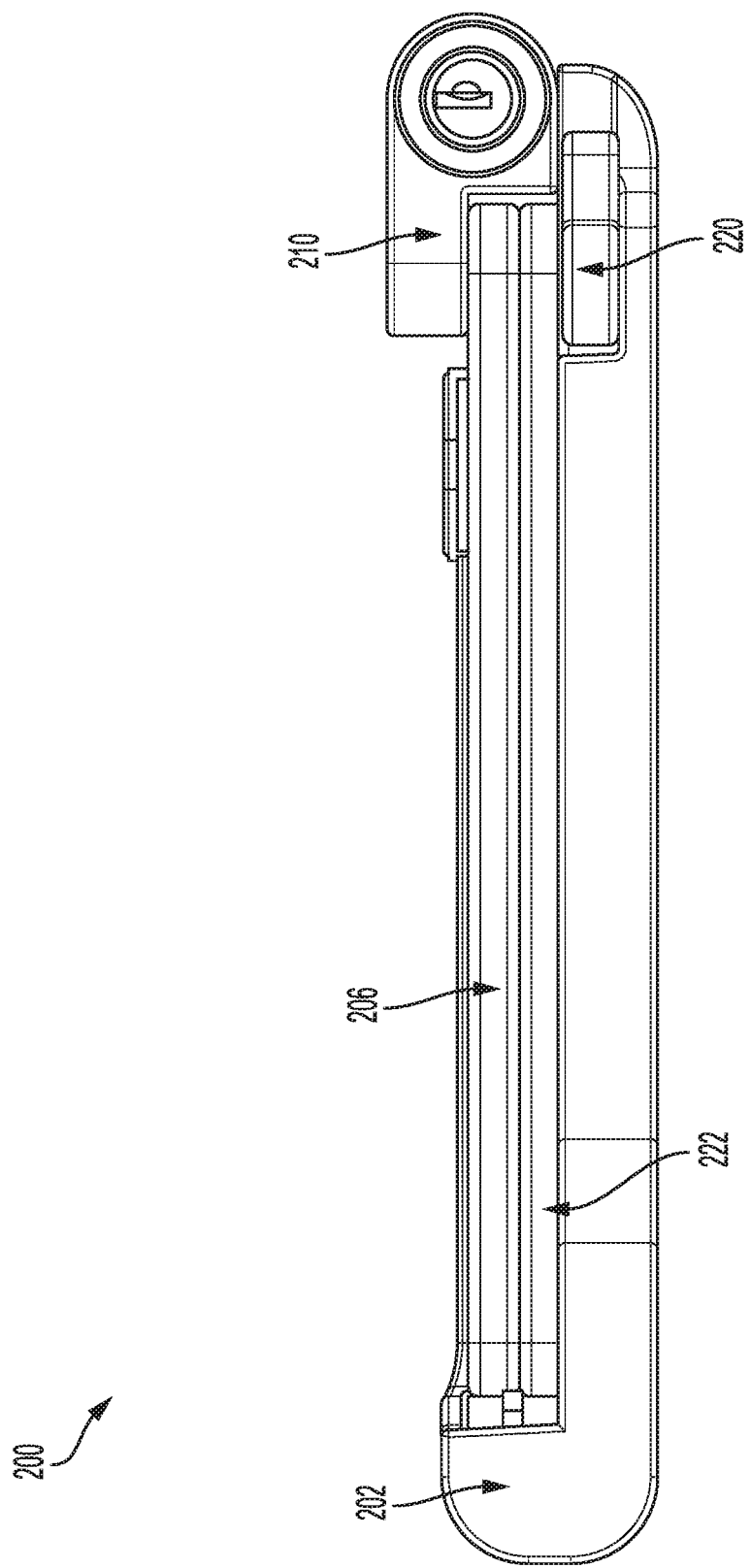
FIG. 2 is an example side view of the device disclosed in its fully folded-up storage and transit mode, unattached to a bike or object, according to embodiments described herein.

FIG. 2 shows an example side view of the device 200 in its fully folded-up storage and transit mode, unattached to a bike or other object. The fastening end 210 is shown clasped together with its opposing fastening end not visible in this view. The example fastening end rests on top of the central link 220 and the protruding point of base 222. The fastening end 210 may be flexibly joined to link arm elements 206 via a rivet or other hinge or other fastener not visible in this view, allowing for angular rotational movement of the fastening end 210 relative to link arm elements 206. Example link arm element 206 may be flexibly joined to link arm element 222 via rivet or other hinge not visible in this view allowing for angular rotational movement of the link arm elements 206 relative to link arm element 222. Example link element 222 may be flexibly joined to central link 220 via rivet or other hinge not visible in this view allowing for angular rotational movement of the link arm elements 206 relative to central link 220. Example central link 220 may be flexibly joined to base 202 via a pin not visible in this view, allowing for angular rotational movement of the central link 220 relative to base 202 perpendicular to the angle of the other flexible joints previously mentioned. All of the elements in the example folded mode, fit snugly into the base 202 in this position and orientation to ease operation of the vehicle it is mounted to. In order for this to be possible, the height of the step in fastening end 210 could be twice the height of one link arm element 206, as shown in the example. This further shows the advantage of this design, in terms of allowing for the device to be folded and stored in a compact manner during riding the bike. When in this arrangement, the user can comfortable and easily ride a bicycle without interference.

Mounted Device Examples

Figure 3:
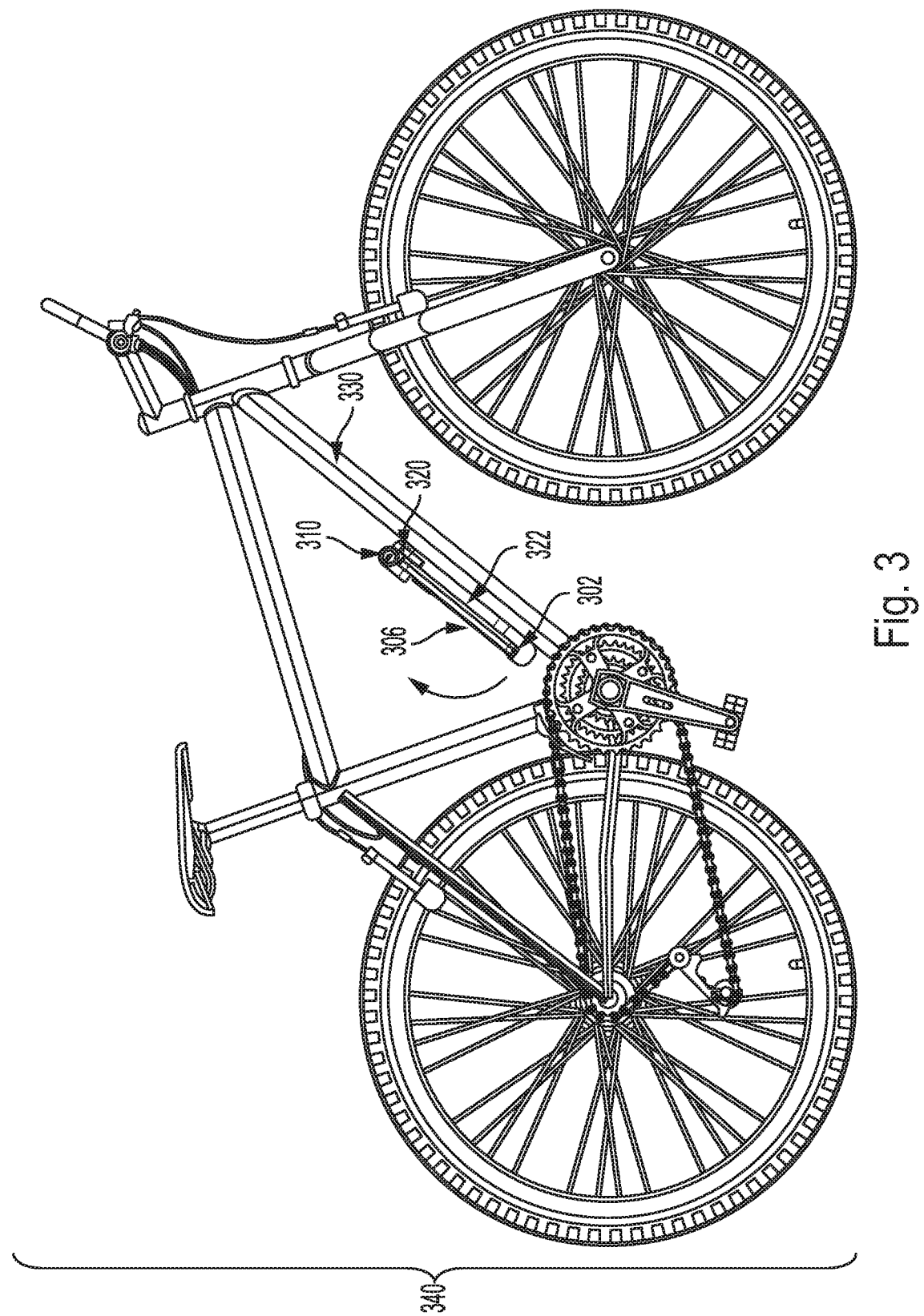
FIG. 3 is an example side view of the device in its fully folded-up storage and transit mode, attached to a bike's down tube, according to embodiments described herein.

FIG. 3 shows a side view of the device in its fully folded-up storage and transit mode, attached to a bike 340 via the down tube 330. In some embodiments, this could be another object that the user would want to secure. The example shows fastening end 310 is clasped together with its opposite fastening end not visible in this view. The example fastening end rests on top of the central link 320 and the protruding point of base 322. The example fastening end 310 is shown flexibly joined to link arm element 306 via a rivet or other hinge not visible in this view, allowing for angular rotational movement of the fastening end 310 relative to link arm elements 306. Example link element 306 may be flexibly joined to link arm element 322 via rivet or other hinge not visible in this view allowing for angular rotational movement of the link arm elements 306 relative to link arm element 322. Example link element 322 may be flexibly joined to central link 320 via rivet or other hinge (or other fastener) not visible in this view allowing for angular rotational movement of the link arm elements 306 relative to central link 320. Example central link 320 may be flexibly joined to base 302 via a pin not visible in this view, allowing for angular rotational movement of the central link 320 relative to base 302 perpendicular to the angle of the other flexible joints previously mentioned. The base 302 is shown rigidly attached to the bike's down tube 330 but it could be mounted to any of various other portions of the vehicle bike. This further shows an advantage of the design, as in the configuration shown, it allows for the device to be folded and stored in a compact manner while the user is riding the bike 340. The mounting position shown in FIG. 3 keeps the device out of the way of the user's legs and the bicycle pedals while riding, and keeps it near where it can be employed (see below) in an economical manner.

Figure 13:
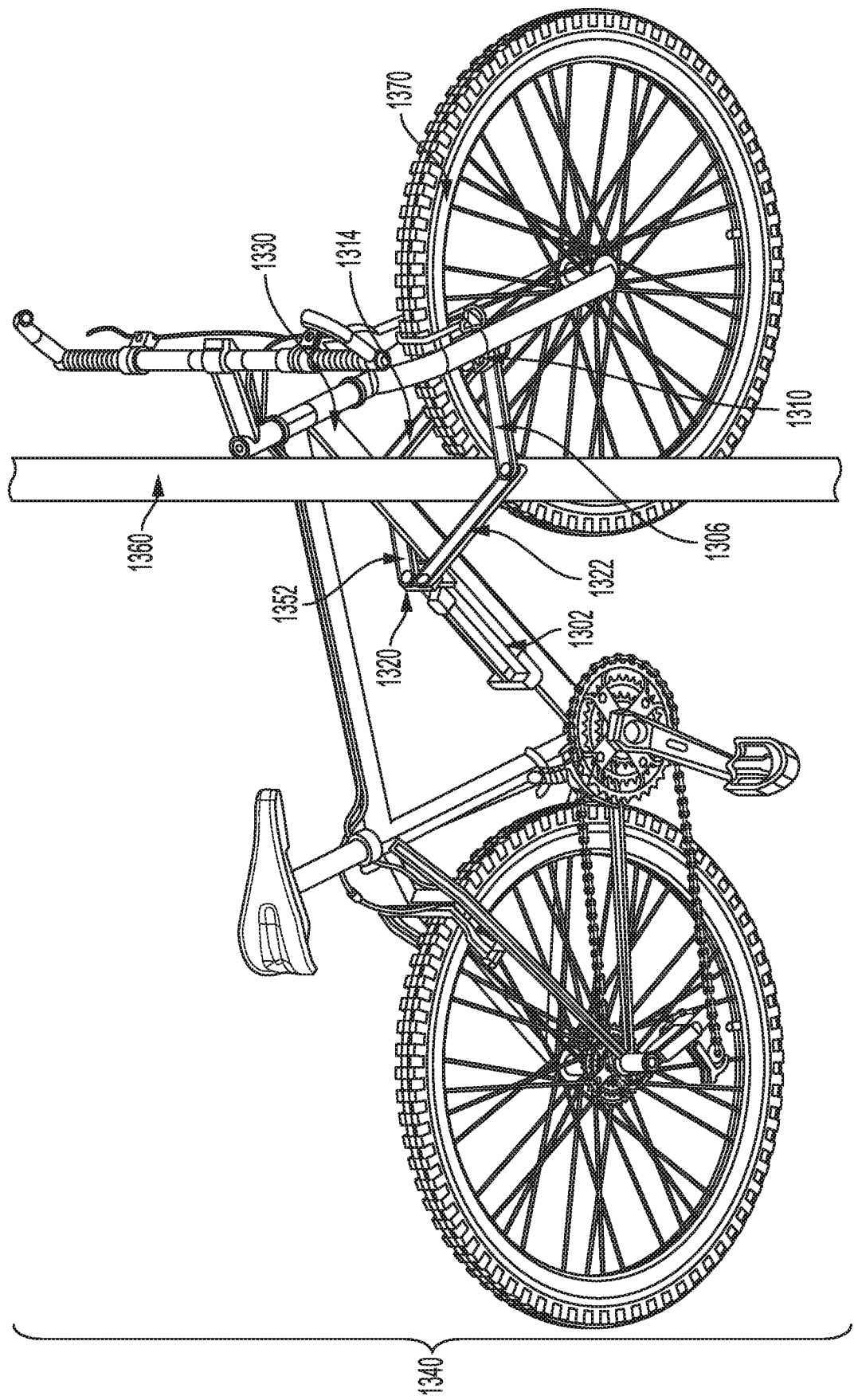
FIG. 13 is an example perspective of the device attached to a bike's down tube in its full locking orientation, securing the frame and wheel to an immovable object such as a street post, according to embodiments described herein.
Figure 14:
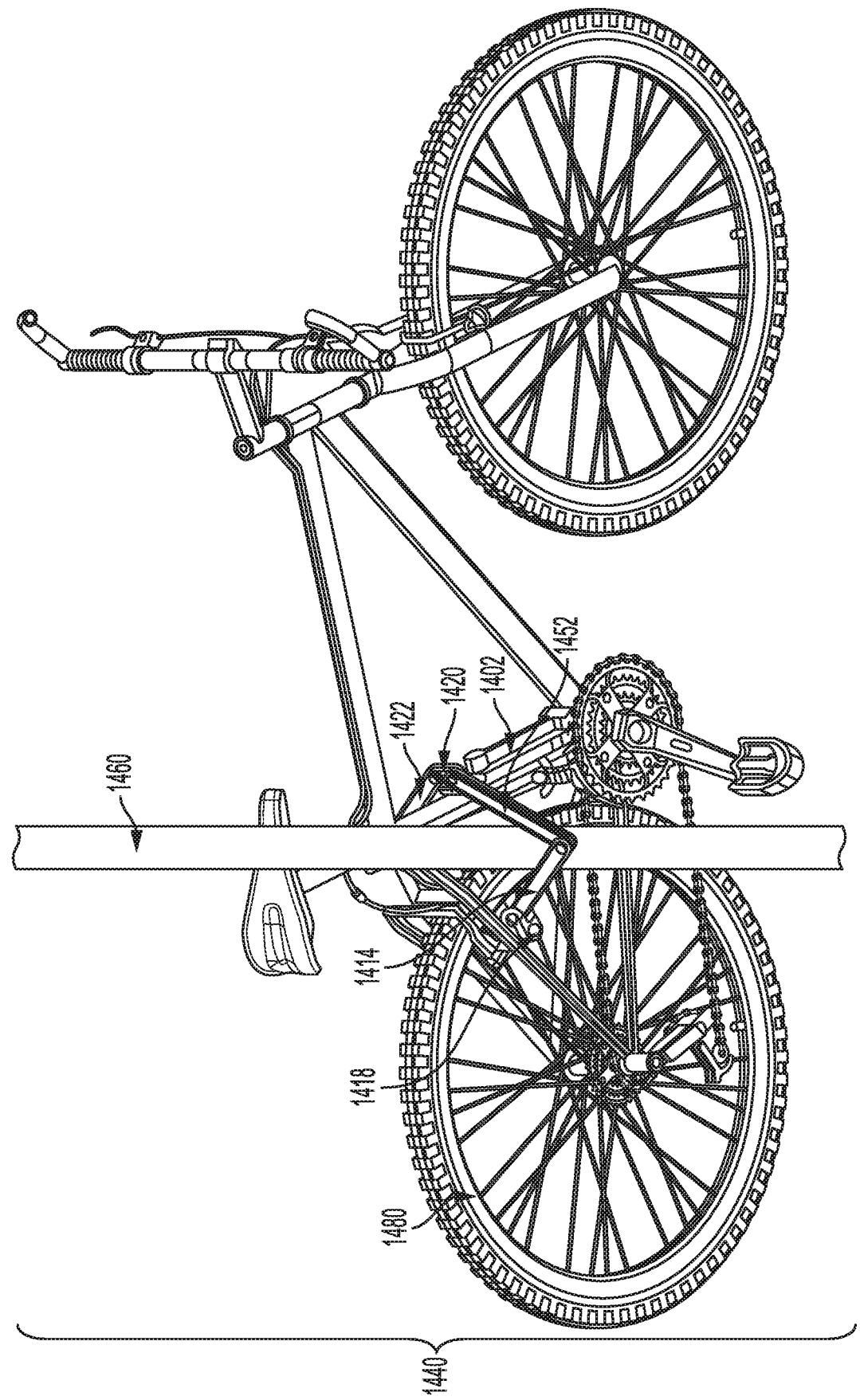
FIG. 14 is an example perspective of the device attached to a bike's seat tube in its full locking orientation, securing the frame and wheel to an immovable object such as a street post, according to embodiments described herein.

As shown in FIG. 3, the base 302 could be fastened to the bicycle frame 340 in any of various ways including but not limited to rivets, screws, pipe clamps, shaft collars, ratcheting mechanisms, zip ties or other devices. In use, the base may remain attached to the bicycle frame (as shown in FIG. 13 and FIG. 14) but if the base portion is unscrewed or detached from the frame by a would-be vandal, the entire locking mechanism would still be locked and attached to the component parts and/or immovable object. Therefore, it may be detached when deployed in use, but that would not allow it to be unlocked.

As described below, the base 302 may remain attached to the bike frame 340 but the arms, still pivot up around the central link 320, as shown by arrow 390. In this way, when pivoted, the arms may be extended and angled so as to move around an immovable object or component part. Below, FIGS. 8, 11, and 14-15 among other figures, also show and describe this pivoting configuration.

Example dimensions of the component parts may include but are not limited to the base 302 with a width of 2.5 inches, a length of 9.5 inches, a depth or thickness of 1.5 inches. An example link arm element 106 may have a width of 0.875 inches, a length of 8 inches, a depth or thickness of 0.375 inches. In some examples, the base 302 may be between 2 and 3 inches wide and have a length of between 8 and 10 inches. In some examples, the base may be between 1 and 2 inches deep or thick. In some examples, the link arms may have a width between 0.5 and 1 inches with a length of between 7 and 9 inches. In some examples, the link arms may be between 0.25 and 0.5 inches thick. Any of these possible combinations or other combinations may be utilized for the sizes and shapes of the component parts, the examples above are merely to illustrate embodiments, but not limit them.

Figure 4:
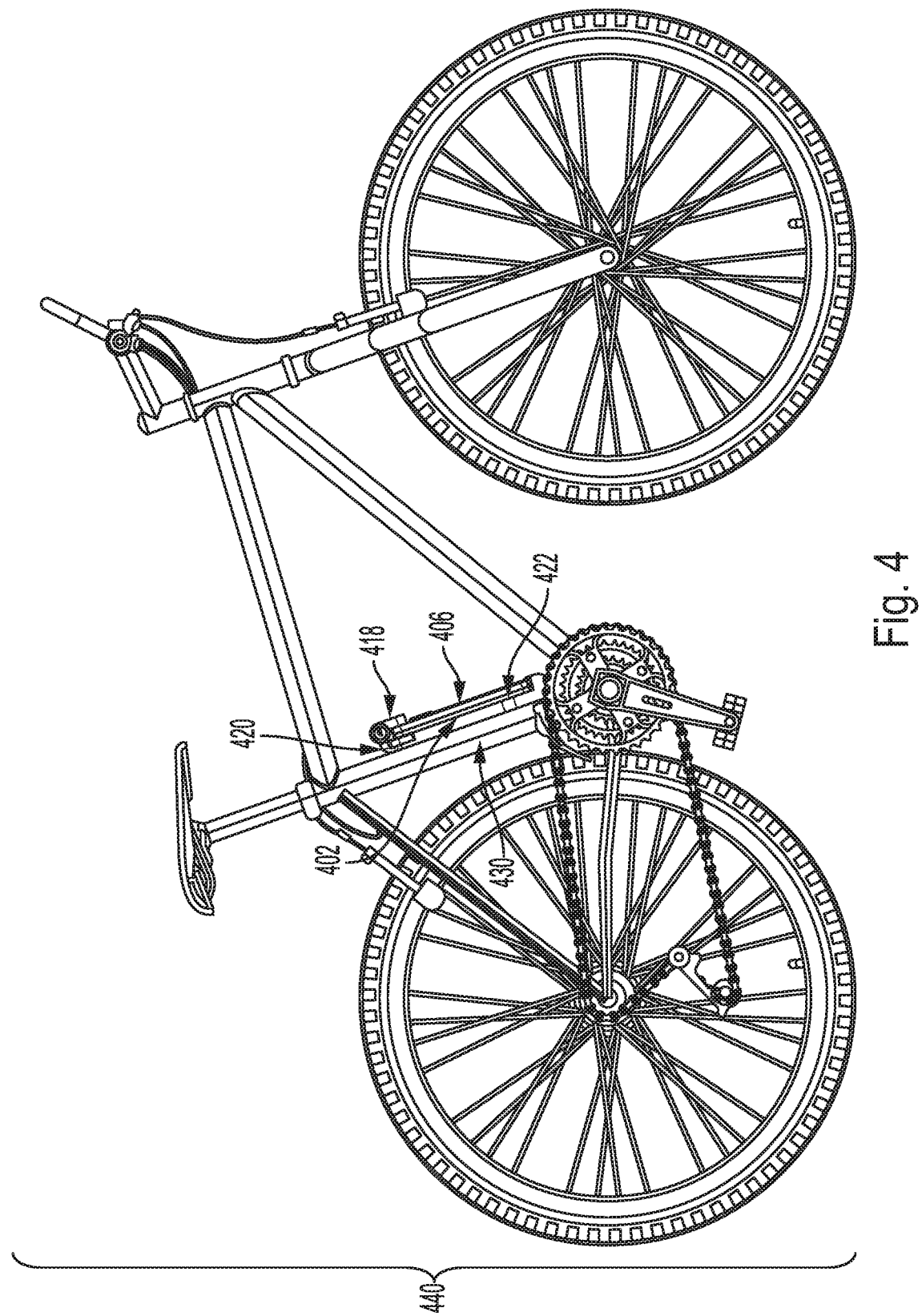
FIG. 4 is an example side view of the device in its fully folded-up storage and transit mode, attached to a bike's seat tube, according to embodiments described herein.

FIG. 4 shows an example side view of the device in its fully folded-up storage and transit mode, attached to a bike 440 via the seat tube 430. In some embodiments, this could be another object that the user would want to secure, or could be secured in any other portion of this or another vehicle or object in need of a locking mechanism. The fastening end 410 is shown clasped together with its opposing fastening end not visible in this view. The example fastening end rests on top of the central link 420 and the protruding point of base 422. The example fastening end 410 may be flexibly joined to link arm element 406 via a rivet or other hinge not visible in this view, allowing for angular rotational movement of the fastening end 410 relative to link arm elements 406. Example link element 406 may be flexibly joined to link arm element 422 via rivet or other hinge not visible in this view allowing for angular rotational movement of the link arm elements 406 relative to link arm element 422. Example link element 422 may be flexibly joined to central link 420 via rivet or other hinge not visible in this view allowing for angular rotational movement of the link arm elements 406 relative to central link 420. Example central link 420 may be flexibly joined to base 402 via a pin not visible in this view, allowing for angular rotational movement of the central link 420 relative to base 402 perpendicular to the angle of the other flexible joints previously mentioned. The base 402 is rigidly attached to the bike's seat tube 430. This further shows an advantage of the design, as it allows for the device to be folded and stored in a compact manner in a different position from FIG. 3, while the user is riding the bike 440. The mounting position of the device keeps the device out of the way of the user's legs and the bicycle pedals while riding. Still other mounting options could be used, FIGS. 2 and 3 are shown as examples only on one particular vehicle, in a non-limiting manner.

Unfolded Device Examples

Figure 5:
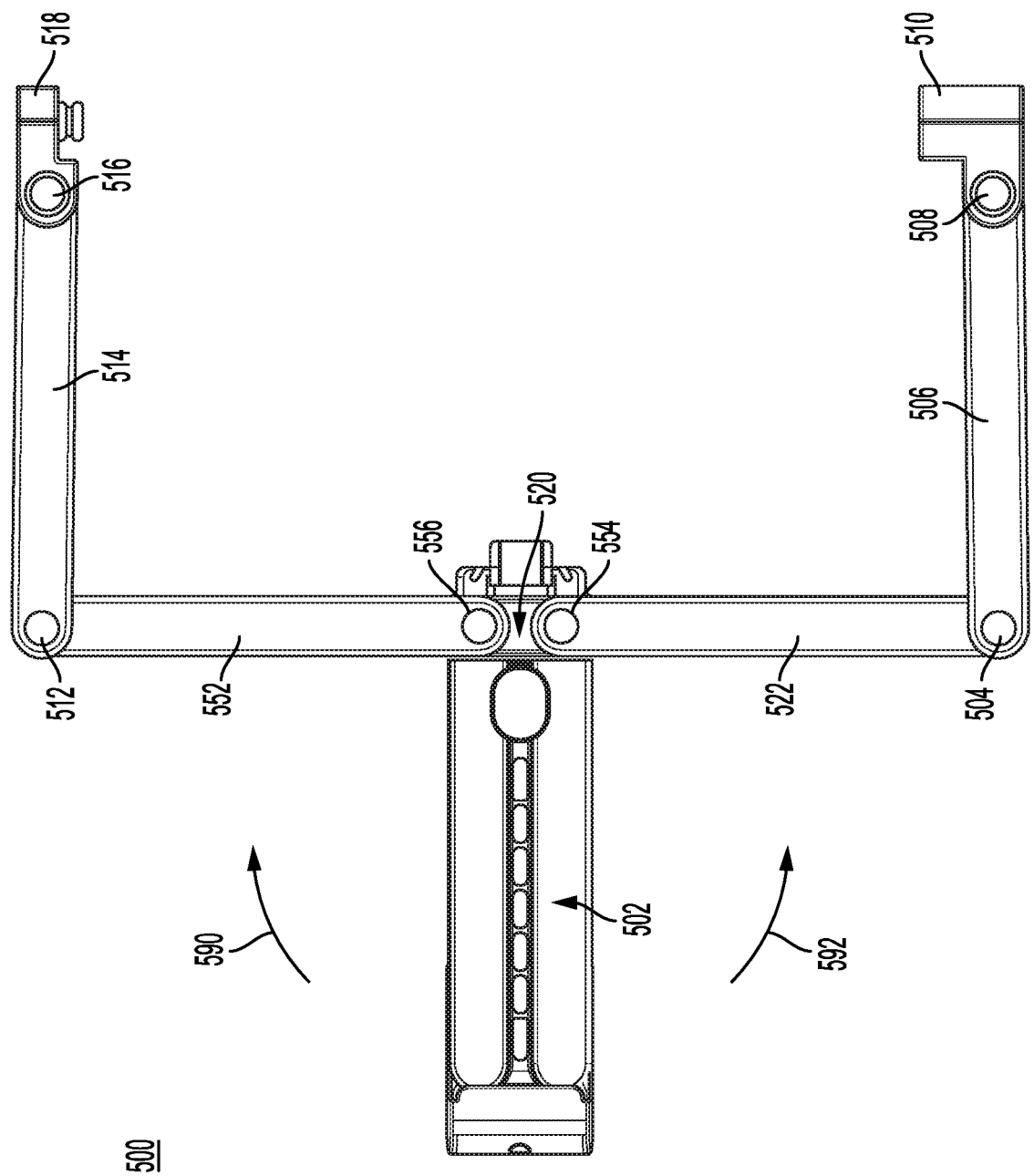
FIG. 5 is an example top view of the flexibly joined elements unfolded, unfastened, unattached to a bike or object with the central perpendicular hinge still in its folded storage orientation, according to embodiments described herein.

FIG. 5 shows an example top view of the device 500 of the flexibly joined link arm elements unfolded, unattached to a bike or object with the central perpendicular hinge 520 in its folded storage orientation, still nested into the base. The two fastening ends 510, 518 are shown clasped together; each one is flexibly joined to link arm elements 506, 514 via rivet or other hinge 508, 516 allowing for angular rotational movement of the fastening ends 510, 518 relative to link arm elements 506, 514. Example link elements 506, 514 may be flexibly joined to link arm elements 522, 552 via rivet or other hinge 504, 502 allowing for angular rotational movement of the link arm elements 506, 514 relative to link arm elements 522, 552. Example link elements 522, 552 may be flexibly joined to central link 520 via rivet or other hinge 554, 556 allowing for angular rotational movement of the link arm elements 522, 552 relative to central link 520. Example, central link 520 may be flexibly joined to base 502 via a pin not visible in this view, allowing for angular rotational movement of the central link 520 relative to base 502 perpendicular to the angle of the other flexible joints previously mentioned.

Generally, the link elements 506, 514 may be flexibly joined to link arm elements 522, 552 and are flat shaped, to aid in the folding into a compact unit as shown in FIGS. 1 and 2. The result is a compact folded up unit that does not interfere with riding the vehicle, yet can extend and grasp an immovable object or component vehicle part such as a wheel, when in the unfolded mode.

In use, the base 502 could be rigidly attached to the bicycle as shown in FIG. 3 or 4, but the bicycle is omitted from FIG. 5 to show the position of the various components of the device. FIG. 5 shows a transition stage between the end states which would be fully-folded transit and storage mode, and fully unfolded and locked mode with the device secured through bicycle frame, wheel and bike rack or other immovable object. FIG. 5 shows an advantage of this design in terms of its ability to encircle multiple and large objects, such as bicycle frames, wheels, and immovable objects to which users secure bicycles when not in use. The design of the length of the arms 552, 514 and 522, 506 would dictate how much reach the device would have, in terms of encircling bicycle component parts and/or immovable objects such as a bike rack. In some examples, the arms 552, 514 and 522, 506 have dimensions of 8 inches. In other examples, the arms 552, 514 and 522, 506 have dimensions between 4 inches and 12 inches. Various sizes of arms 552, 514 and 522, 506 could be constructed based on the type of vehicle it is to be employed and the size. For example, a bicycle of a child may require shorter arms 552, 514 and 522, 506 than a bicycle of an adult.

Still another advantage of this device shown in FIG. 5 is that the fastening ends 510, 518 may be easily moved and manipulated, while the fixed base 502 constrains the overall reach and movement of the link arm. Other known devices of similar construction do not include this permanent attachment feature, making the process of securing bicycles less constrained and more time consuming as the other link arms move in any direction during the locking process. And while keeping the base 502 attached to the bicycle frame (not shown in FIG. 5) or other part of the vehicle also allows for quick retraction and stowage for driving off. For example, this is especially advantageous during unlocking, or transitioning from the unfolded and locked state to the fully folded transit and storage mode. The flexible attachment to the base 502, which may be rigidly attached to the bicycle, constrains the movement of the flexible link arms while the users hands are controlling the position of the fastening ends 510, 518. With only one flexible joint uncontrolled by either the users hands or the attachment to the base, the user can reattach the fastening ends 510, 518, moving them from the unfolded and locked position to the folded transit and storage position in only two steps. The first step may be the movement of the fastening ends 510, 518, the second is positioning the uncontrolled link arm elements 506, 514, 522, 552 into its storage position. Other known devices of similar construction are not attached to the bicycle throughout their various stages of use, resulting in more time and steps involved in transitioning from locked and unfolded to unlocked storage and transit position. FIG. 5 also shows the direction the arms 552, 514 and 522, 506 can pivot out from the base 502. Arrows 590, 592 show how the arms 552, 514 and 522, 506 can swing away from the base 502 when in a stowed position and into an outward direction to then encircle an immovable object or bicycle component (not shown). In such a way, the hinges 556, 554, 512, 504 may allow for the arms 552, 514 and 522, 506 to pivot in a plane parallel to the base 502.

FIGS. 13 and 14 below show more examples of the attachment and movement of the arms 552, 514 and 522, 506 around an immovable object when in use.

Figure 6:
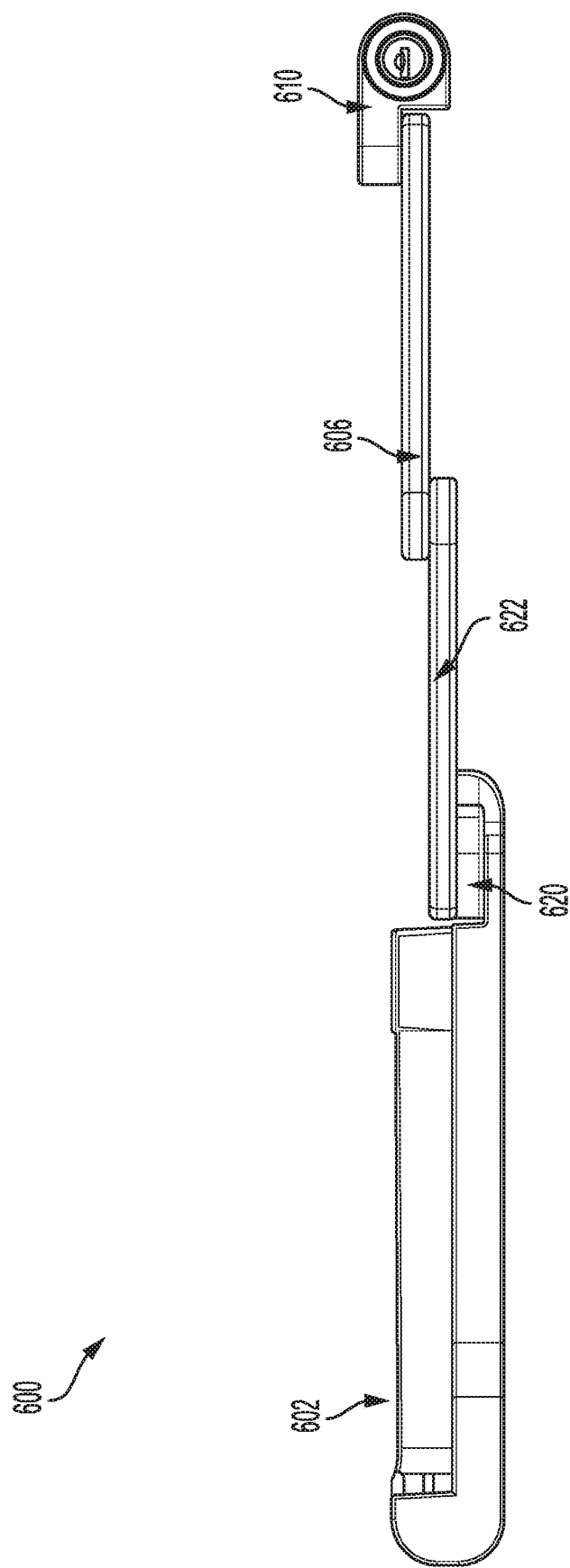
FIG. 6 is an example side view of the flexibly joined elements unfolded, unfastened, unattached to a bike or object with a central perpendicular hinge still in its storage orientation, according to embodiments described herein.

Now turning to FIG. 6 which shows an example side view of the device 600 unfolded, unfastened, unattached to a bike or object with the central link 620 still in its folded storage orientation, nested into the base 602. The fastening end 610 is shown in an unclasped configuration; its opposite fastening end not visible in FIG. 6. The example fastening end 610 extends from the base 602. The example fastening end 610 is flexibly joined to link arm elements 606 via a rivet or other hinge or other fastener not visible in this view, allowing for angular rotational movement of the fastening end 610 relative to link arm elements 606. Example link element 606 may be flexibly joined to link arm element 622 via rivet or other hinge not visible in this view allowing for angular rotational movement of the link arm elements 606 relative to link arm element 622. Example link element 622 may be flexibly joined to central link 620 via rivet or other hinge or other fastener not visible in this view allowing for angular rotational movement of the link arm elements 606 relative to central link 620. Example central link 620 may be flexibly joined to base 602 via a pin not visible in this view, allowing for angular rotational movement of the central link 620 relative to base 602 perpendicular to the angle of the other flexible joints previously mentioned.

In use, the base 602 could be rigidly attached to the bicycle, but the bicycle is omitted from FIG. 6 to show the position of the various components of the device. FIG. 6 represents a transition stage between the end states, fully-folded transit and storage mode, and fully unfolded and locked mode with the device secured through bicycle frame, wheel and bike rack or other immovable object. The various advantages of the device as shown in this view are the same as those described in the detailed description of FIG. 5.

Figure 7:
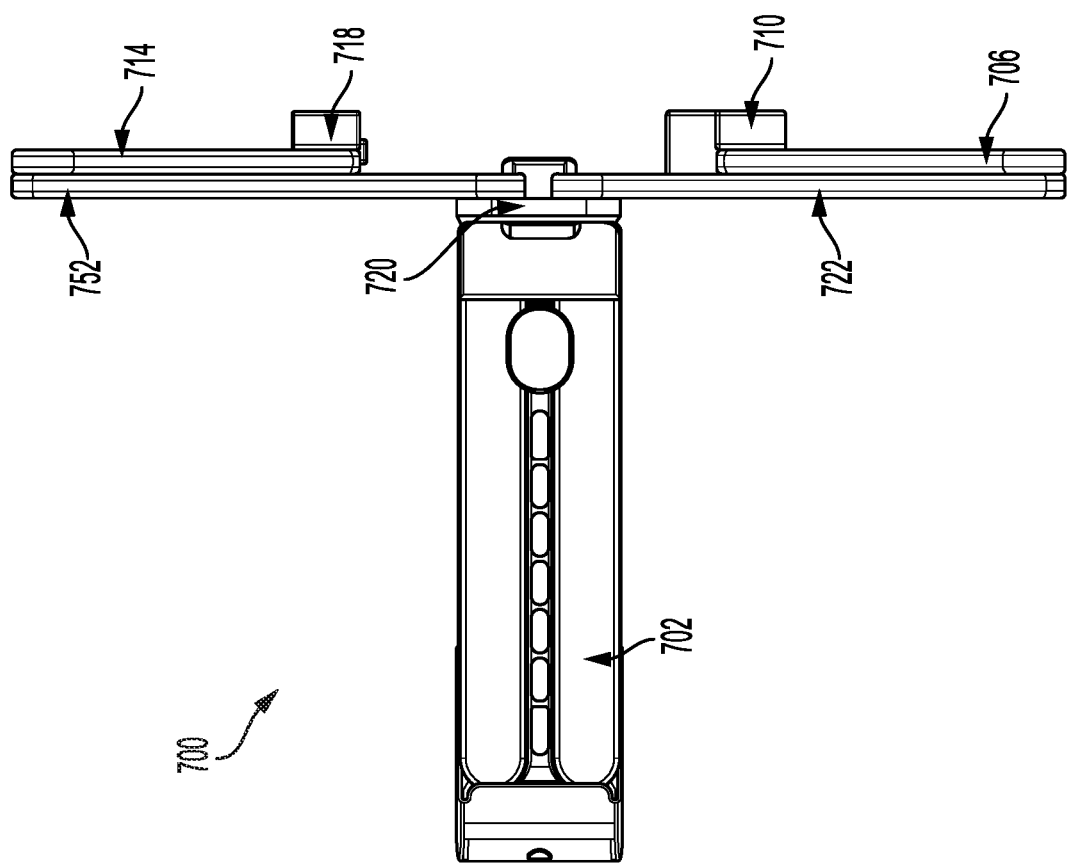
FIG. 7 is an example is a top view of the flexibly joined elements unfolded, unfastened, unattached to a bike or object with the central perpendicular hinge pivoted to its locking orientation.

FIG. 7 shows an example top view of the device 700 unfolded, unattached to a bike or object with the central link 720 pivoted to its locking position, perpendicular to the base 702 such that the other link arm elements could encircle the bicycle frame, wheel and bike rack or immovable object that will be used to secure the bicycle. The two fastening ends 710, 718 are unclasped and separated; each one is flexibly joined to link arm elements 706, 714 via rivet or other hinges hidden in this view allowing for angular rotational movement of the fastening ends 710, 718 relative to link arm elements 706, 714. Example link elements 706, 714 may be flexibly joined to link arm elements 722, 752 via rivet or other hinges or other fasteners hidden in this view allowing for angular rotational movement of the link arm elements 706, 714 relative to link arm elements 722, 752. Example link elements 722, 752 may be flexibly joined to central link 720 via rivet or other hinges or other fasteners not seen in this view allowing for angular rotational movement of the link arm elements 722, 752 relative to central link 720.

Example central link 720 may be flexibly joined to base 702 via a pin not visible in this view, allowing for angular rotational movement of the central link 720 relative to base 702 perpendicular to the angle of the other flexible joints previously mentioned. In use, the base 702 could be rigidly attached to the bicycle, but the bicycle is omitted from this image to show the position of the various components of the device.

FIG. 7 shows an example second transition stage between the start and end states, fully-folded transit and storage mode, and fully unfolded and locked mode with the device secured through bicycle frame, wheel and bike rack or other immovable object. FIG. 7 also shows the motion capable by the device that the perpendicular hinge 720 allows for, that is the rotation of the link arm about the perpendicular hinge. This allows for the link arm to exist at different angles in their two modes, folded storage and transit mode and unfolded locked mode.

The other various advantages of the device as shown in this view are the same as those described in the detailed description of FIG. 5.

Figure 8:
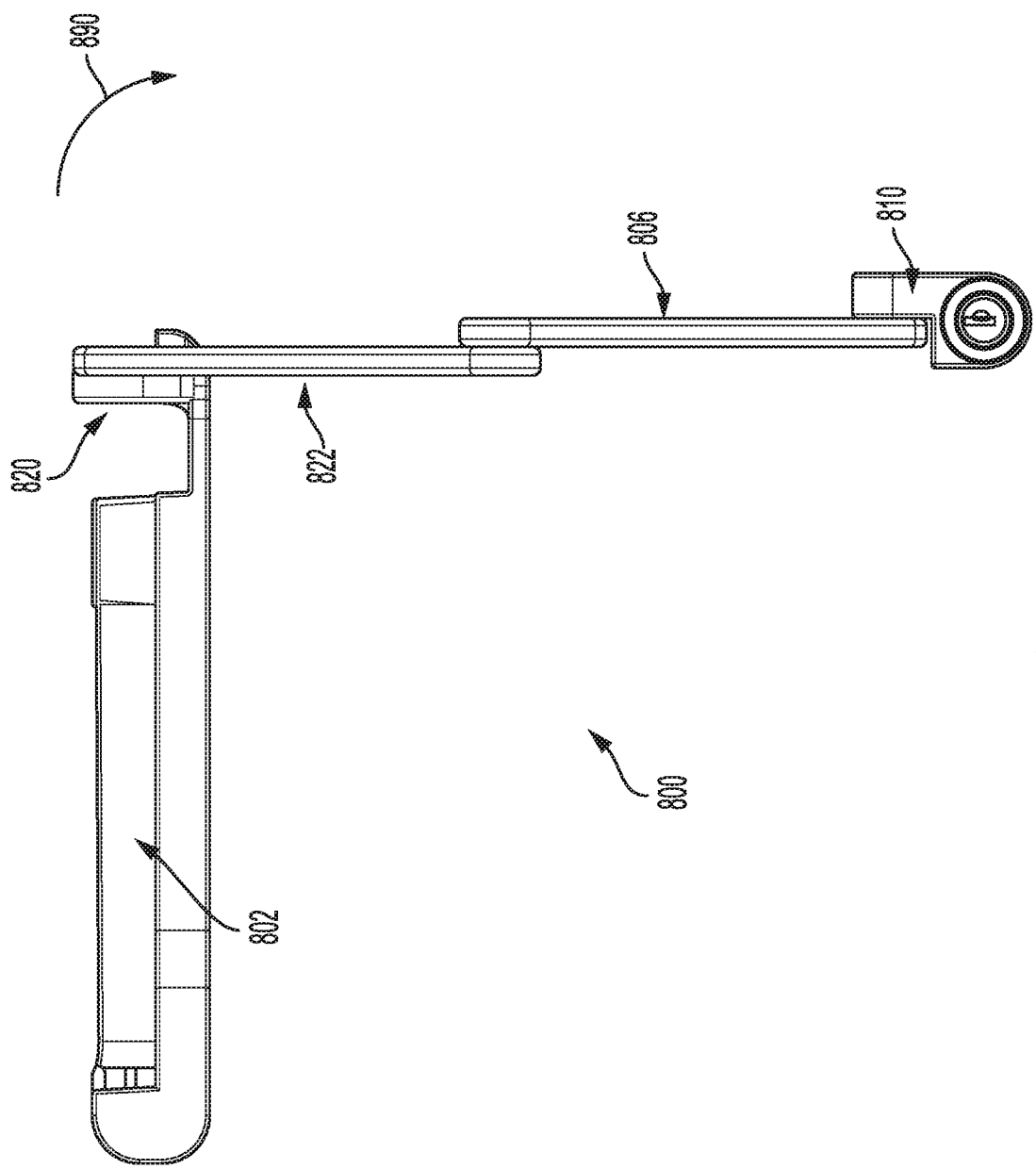
FIG. 8 is an example side view of the flexibly joined elements unfolded, unfastened, unattached to a bike or object with the central perpendicular hinge pivoted to its locking orientation, according to embodiments described herein.

FIG. 8 shows an example side view of the device 800 unfolded, unfastened, unattached to a bike or object with the central link 820 pivoted to its locking position, perpendicular to the base 802 such that the other link arm elements could encircle the bicycle frame, wheel and bike rack or immovable object that will be used to secure the bicycle. Thus, as shown, the arms 822, 806 (and opposite arms not shown) are capable of pivoting forward as shown by arrow 890. This configuration allows for the entire arm system 822, 806 (and opposite arms not shown) to pivot out of plane with the base 802 which may remain affixed to a bicycle frame. By the hinge 820, the ability to grasp objects which are located at many various angles from the attached vehicle become possible. It should be mentioned that the configuration shown in FIG. 8 is not limiting in that the arms 822, 806 (and opposite arms not shown) may pivot through this all the way forward, and may be stopped anywhere in between the configuration shown in FIG. 6, where the arms (622, 602 and opposite arms not shown in FIG. 6) are shown stretched from the base 602 in FIG. 6 but still in plane with the base 602. Thus, FIG. 6 shows the arms (622, 602 and opposite arms not shown in FIG. 6) before the arms are pivoted forward and out of plane with the base 802 in FIG. 8, and in a downward motion 890 as shown in FIG. 8. Thus, the out-of-plane pivot of the arms 822, 806 (and opposite arms not shown) in this multitude of degrees allows for a multitude of options to grasp around an immovable object and/or bicycle component to secure around.

In FIG. 8 the fastening end 810 is shown unclasped; its opposite fastening end not visible in this view. The example fastening end 810 may be flexibly joined to link arm elements 806 via a rivet or other hinge or other example fastener not visible in this view, allowing for angular rotational movement of the fastening end 810 relative to link arm elements 806 as shown for example in FIG. 9. Example link arm element 806 may be flexibly joined to link arm element 822 via rivet or other hinge or other example fastener not visible in this view allowing for angular rotational movement of the link arm elements 806 relative to link arm element 822. Example link arm element 822 may be flexibly joined to central link 820 via rivet or other hinge not visible in this view allowing for angular rotational movement of the link arm elements 822 relative to central link 820. Example central link 820 may be flexibly joined to base 802 via a pin not visible in this view, allowing for angular rotational movement of the central link 820 relative to base 802 perpendicular to the angle of the other flexible joints previously mentioned. In use, the base 802 could be rigidly attached to the bicycle, but the bicycle is omitted from this image for to show the position of the various components of the device.

It should be noted that when in the fully locked position, around an immovable object or component part such as a wheel, the base 802 may be still mounted to the vehicle, because of the ability of the central link 820 to hinge about an axis that is perpendicular to the axes of the hinges in the link arms 822, 806, etc. Thus, when the link arms are connected and locked, even if the base is somehow removed from being affixed to the vehicle, the arms would still secure the vehicle to the immovable object, or the component parts such as the frame and wheel. Thus, when in locked mode, only the key or combination would be able to unlock the arms, and thereby the vehicle or whatever is grasped around by the link arms.

The various advantages of the device as shown in this view are the same as those described in the detailed description of FIG. 7.

In FIG. 8*a*, an example central link 820 is shown in a close up view, separate from the base, attached only to link arm elements 822 and 852. In this view the central link pin 884 can be seen. The orientation of the central link pin 884 allows for central link 820 to rotate on an axis running through the center of the pin and thereby pivot in a dimension perpendicular to the swinging pivots of the link arm elements 822, 852. Separately, the orientation of the two rivet or other hinges 854 and 856 or other wing hinge portions, allow for the two link arm elements 822 and 852 to rotate on an axis at the center of the two rivet or other hinges 854 and 856 or other wing hinge portions. The axis of rotation that the rivets or other hinges 854, 856 allows is perpendicular to the axis of the central link pin 884. As the central link 820 accommodates three separate flexible joint connections, it allows for the complex movement of the device as it transitions from folded storage mode, that is the device can rotate on more than one axes as the fastening ends move from storage to encircle the wheel frame and rack in locked mode.

FIG. 9 shows an example front view of the device unfolded, unfastened, unattached to a bike or object with the central link 920 pivoted to its locking position, perpendicular to the base 902 such that the other link arm elements could encircle the bicycle frame, wheel and bike rack or immovable object that will be used to secure the bicycle. FIG. 9 shows a front view of FIG. 8 in this way. As shown in FIG. 9, the fastening ends 910, 928 are unclasped. The fastening ends 910, 928 may be flexibly joined to link arm elements 906, 914 via rivets or other hinges 908, 916 or other fasteners, allowing for angular rotational movement of the fastening ends 910, 918 out and down and around relative to link arm elements 906, 914 and base 902 as shown by arrows 990, 992. Example link arm elements 906, 914 may be flexibly joined to link arm element 922, 952 via rivets or other hinges or other fasteners 904, 912 allowing for angular rotational movement of the link arm elements 906 914 relative to link arm element 922 952. Example link arm elements 922 952 may be flexibly joined to central link 920 via rivets or other hinges or other example fasteners 954 956 allowing for angular rotational movement of the link arm elements 922 952 relative to central link 920. Central link 920 may be flexibly joined to base 902 via a pin or other hinge not visible in this view, allowing for angular rotational movement of the central link 920 relative to base 902 perpendicular to the angle of the other flexible joints previously mentioned as shown above in FIG. 8. In use, the base 902 could be rigidly attached to the bicycle, but the bicycle is omitted to show the position of the various components of the device. The various advantages of the device as shown in this view are the same as those described in the detailed description of FIG. 7.

FIG. 10 shows an example top view of the device 1000 unfolded, unattached to a bike or object with the central link 1020 pivoted to its locking position, perpendicular to the base 1002 such that the other link arm elements could encircle the bicycle frame, wheel and bike rack or immovable object that will be used to secure the bicycle. The two fastening ends 1010, 1018 are shown in a clasped configuration; each one may be flexibly joined to link arm elements 1006, 1014 via rivets or other hinges or other fasteners hidden in this view allowing for angular rotational movement of the fastening ends 1010, 1018 relative to link arm elements 1006, 1014. Example link arm elements 1006, 1014 may be flexibly joined to link arm elements 1022, 1052 via rivets or other hinges hidden in this view allowing for angular rotational movement of the link arm elements 1006, 1014 relative to link arm elements 1022, 1052. Example link arm elements 1022, 1052 may be flexibly joined to central link 1020 via rivets or other hinges not seen in this view allowing for angular rotational movement of the link arm elements 1022, 1052 relative to central link 1020. Example central link 1020 may be flexibly joined to base 1002 via a pin or other hinge not visible in this view, allowing for angular rotational movement of the central link 1020 relative to base 1002 perpendicular to the angle of the other flexible joints previously mentioned. In use, the base 1002 could be rigidly attached to the bicycle, but the bicycle is omitted from this image to show the position of the various components of the device. In use, the link arm could loop through and encircling the bike frame, wheel, and rack, but these elements are omitted from this image for better visual clarity regarding the position of the various components of the device. This shows the unfolded, locked mode of the device. The advantages of the device as shown in this figure are the same as those described in FIG. 7.

Figure 11:
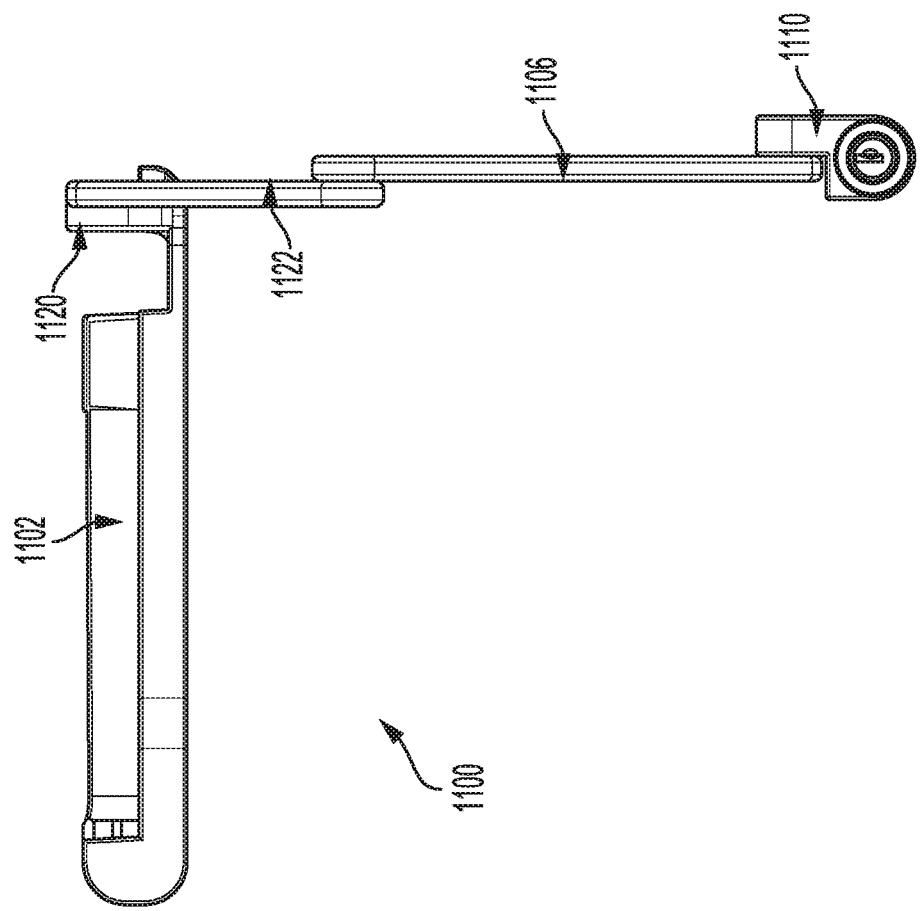
FIG. 11 is an example side view of the flexibly joined elements unfolded, fastened, unattached to a bike or object with the central perpendicular hinge pivoted to its locking orientation, according to embodiments described herein.

FIG. 11 shows a side view of the device 1100 unfolded, unfastened, unattached to a bike or object with the central link 1120 pivoted to its locking position, perpendicular to the base 1102 such that the other link arm elements could encircle the bicycle frame, wheel and bike rack or immovable object that will be used to secure the bicycle. In FIG. 11, the fastening end 1110 is shown clasped to its opposite fastening end not visible in this view. The fastening end 1110 extends from the base 1102. The fastening end 1110 may be flexibly joined to link arm elements 1106 via a rivet or other hinge or other fastener not visible in this view, allowing for angular rotational movement of the fastening end 1110 relative to link arm elements 1106. Example link arm element 1106 may be flexibly joined to link arm element 1122 via rivet or other hinge not visible in this view allowing for angular rotational movement of the link arm elements 1106 relative to link arm element 1122. Example link arm element 1122 may be flexibly joined to central link 1120 via rivet or other hinge not visible in this view allowing for angular rotational movement of the link arm elements 1122 relative to central link 1120. Example central link 1120 may be flexibly joined to base 1102 via a pin not visible in this view, allowing for angular rotational movement of the central link 1120 relative to base 1102 perpendicular to the angle of the other flexible joints previously mentioned. In use, the base 1102 could be rigidly attached to the bicycle, but the bicycle is omitted from this image for better visual clarity regarding the position of the various components of the device. In use, the link arm could loop through and encircling the bike frame, wheel, and rack, but these elements are omitted from this image for better visual clarity regarding the position of the various components of the device. FIG. 11 shows the unfolded, locked mode of the device. The various advantages of the device as shown in this view are the same as those described in the detailed description of FIG. 7.

Figure 12:
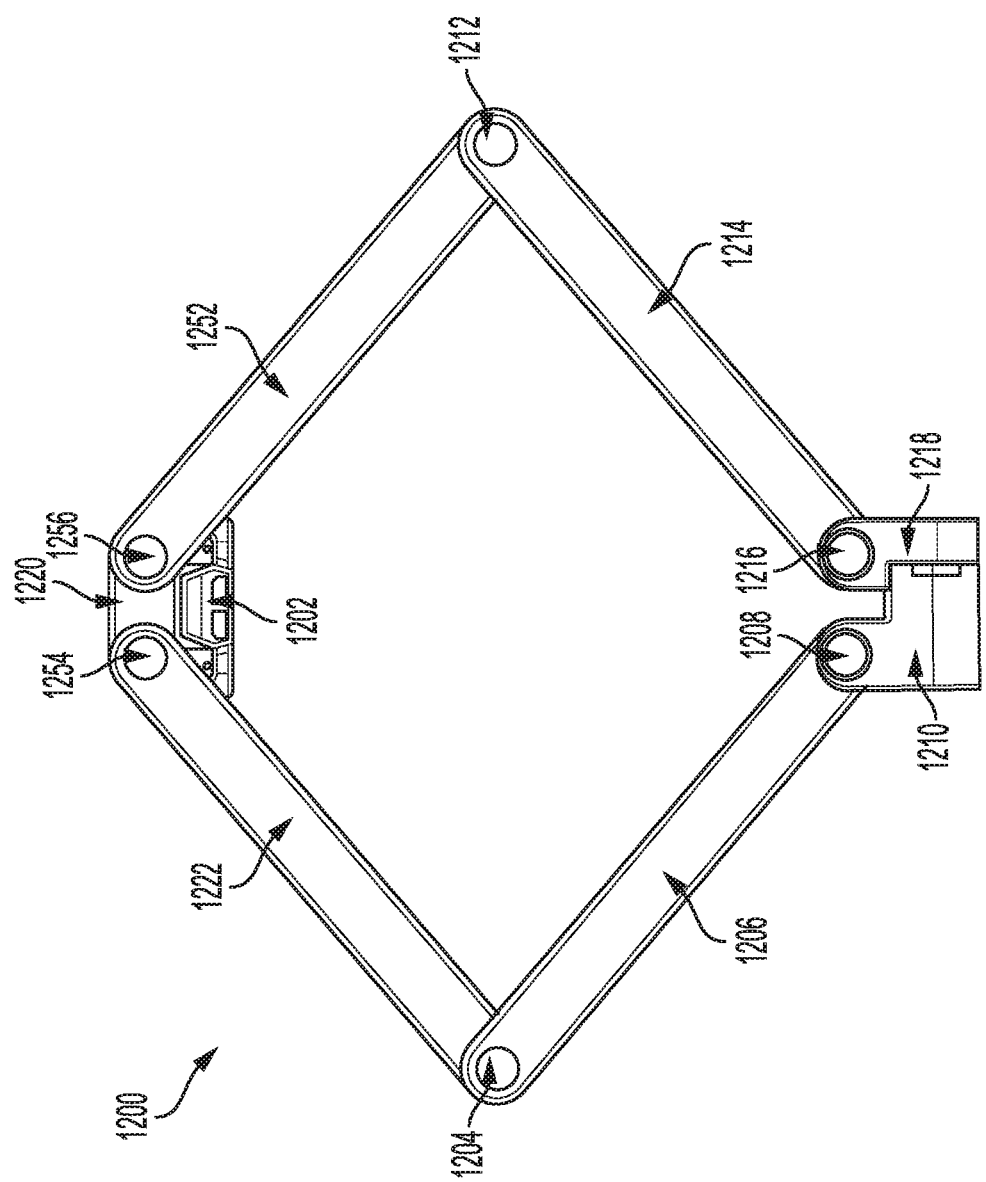
FIG. 12 is an example front view of the flexibly joined elements unfolded, fastened, unattached to a bike or object with the central perpendicular hinge pivoted to its locking orientation, according to embodiments described herein.

FIG. 12 shows an example front view of the device 1200 unfolded, unfastened, unattached to a bike or object with the central link 1220 pivoted to its locking position, perpendicular to the base 1202 such that the other link arm elements could encircle the bicycle frame, wheel and bike rack or immovable object that will be used to secure the bicycle. FIG. 12 shows the fastening ends 1210, 1228 clasped together. The fastening ends 1210, 1228 may be flexibly joined to link arm elements 1206, 1214 via rivets or other hinges or other fasteners 1208, 1216, allowing for angular rotational movement of the fastening ends 1210, 1218 relative to link arm elements 1206, 1214. Link elements 1206, 1214 may be flexibly joined to link arm element 1222, 1252 via rivets or other hinges 1204, 1212 allowing for angular rotational movement of the link arm elements 1206, 1214 relative to link arm element 1222, 1252. Link elements 1222, 1252 may be flexibly joined to central link 1220 via rivets or other hinges 1254, 1256 allowing for angular rotational movement of the link arm elements 1222, 1252 relative to central link 1220. Central link 1220 may be flexibly joined to base 1202 via a pin or other hinge not visible in this view, allowing for angular rotational movement of the central link 1220 relative to base 1202 perpendicular to the angle of the other flexible joints previously mentioned. In use, the base 1202 could be rigidly attached to the bicycle, but the bicycle is omitted from this image to show the position of the various components of the device. In use, the link arm could loop through and encircling the bike frame, wheel, and rack, but these elements are omitted from this image for better visual clarity regarding the position of the various components of the device. The various advantages of the device as shown in this view are the same as those described in the detailed description of FIG. 7.

FIGS. 1,2,5,6,7,8,12,11,12 together in series show an example process of using this device in transitioning between folded storage and transit mode to unfolded locked mode, with the intermediary steps and rotational angles not shown in their entirety. That is, the hinged portions of the link arms are shown in various configurations of folded and unfolded states, but the intermediary positions may also be attained by the link arms, as they hinges and pivots allow for a full range of motion throughout the folding and unfolding steps.

In Use Device Examples

FIG. 13 is an example perspective view of the device attached to a bike 1340 via the down tube 1330, in its full locking orientation, securing the bike 1340 frame and wheel 1370 to an immovable object such as a street post 1360. In some embodiments, this could be another object that the user would want to secure to the bike. FIG. 13 shows the fastening end 1310 clasped together with its opposite fastening end not visible in this view. The fastening end 1310 may be flexibly joined to link arm element 1306 via a rivet or other hinge or other fastener allowing for angular rotational movement of the fastening end 1310 relative to link arm elements 1306. Example link arm element 1306 may be flexibly joined to link arm element 1322 via rivet or other hinge or other fastener allowing for angular rotational movement of the link arm elements 1306 relative to link arm element 1322 Example link arm element 1322 may be flexibly joined to central link 1320 via a rivet or other hinge or other fastener allowing for angular rotational movement of the link arm elements 1306 relative to central link 1320. Central link 1320 may be flexibly joined to base 1302 via a pin or other hinge not visible in this view, allowing for angular rotational movement of the central link 1320 relative to base 1302 perpendicular to the angle of the other flexible joints previously mentioned. The base 1302 is shown rigidly attached to the bike's down tube 1330 by fasteners. The link arm of the device may pass through the open loop of the bike 1340 frame at the down tube 1330, through the wheel 1370 and around the post or immovable object 1360 when in use. Thus, FIG. 13 shows the an example position of the elements of the device when mounted to the bicycles down tube and in locking orientation. It also shows the ability of the device to encircle the bicycle's frame, wheel, and large immovable objects, while remaining attached to the bike.

FIG. 14 is an example perspective view of the device attached to a bike 1440 via the seat tube 1430, in its full locking orientation, securing the frame and wheel to an immovable object such as a street post. In some embodiments, this could be another object that the user would want to secure. The fastening end 1410 is shown clasped together with its opposite fastening end not visible in this view. FIG. 14 shows the fastening end 1410 flexibly joined to link arm element 1406 via a rivet or other hinge or other fastener allowing for angular rotational movement of the fastening end 1410 relative to link arm elements 1406. Example link arm element 1406 may be flexibly joined to link arm element 1422 via rivet or other hinge or other fastener allowing for angular rotational movement of the link arm elements 1406 relative to link arm element 1422. Link element 1422 may be flexibly joined to central link 1420 via rivet or other hinge or other fastener allowing for angular rotational movement of the link arm elements 1406 relative to central link 1420. Example central link 1420 may be flexibly joined to base 1402 via a pin not visible in this view, allowing for angular rotational movement of the central link 1420 relative to base 1402 perpendicular to the angle of the other flexible joints previously mentioned. The base 1402 is rigidly attached to the bike's seat tube 1430. The link arm of the device passes through the open loop of the bike frame at the seat tube 1430, through the wheel 1470 and around the post or immovable object 1460. FIG. 14 thus shows the position of the elements of the device when mounted to the bicycles seat tube and in locking orientation. It also shows the ability of the device to encircle the bicycle's frame, wheel, and large immovable objects, while remaining attached to the bike.

Lock Examples

Any of various locking features could be used to fasten and release the ends of the link arms when securing the system to an immovable object, or a component part. One such example is shown in FIG. 15 which shows a close up view of the example fastening ends 1510 and 1518. In this example, the male mating component 1590 is not connected to the female receiver component 1510 in this view. In this example, the locking mechanism is comprised of a male mating component 1509 with specific geometry that can only be removed from the receiver 1510 when the internal geometry of the receiver 15010 changes position such that the geometry of the male mating component 1509 does not contact and interfere with any part of the female receiver component 1510 upon exiting the receiver 1510. In this example, the female receiver components 1510 internal components position can be changed using a key, which only the lock owner possesses. In other examples, the orientation of the internal geometry of the female receiver component could be changed via a combination lock, or using an electromagnetic, radio, or digital signal coming from a cell phone, remote wireless device, or other electronic device. Still other locking options could be used, FIG. 15 is shown as examples only of one particular known locking mechanism, in a non-limiting manner.

It should be noted that a key, combination, or other kind of lock could be used to secure and unsecure the two arms together as described herein. Key locks would be able to unlatch the locked portions with the insertion and turning of a key as per customary use. Similarly, a combination lock may be built into one of the two sides of the two-part lock system in order to allow for the turning of numbers or letters in a barrel-shaped spinning lock arrangement, or a turning of a wheel combination, as is known in the art to lock and/or unlock the two arms.

CONCLUSION

For reasons of practical application, the invention described can be subject to numerous modifications and variations in the details of its construction but without thereby departing from the scope of the inventive concept. From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention(s) have been described above in the context of those embodiments, other embodiments may also exhibit such advantages, and not all embodiments need necessarily exhibit such advantages to fall within the scope of the invention. Accordingly, the invention is not limited, except as by the appended claims.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention(s) with which that terminology is associated. In general, the terms used in the following claims should not be construed to limit the invention(s) to the specific examples disclosed in the specification, unless the above Detailed Description section explicitly defines such terms. Accordingly, the actual scope of the invention(s) encompasses not only the disclosed examples, but also all equivalent ways of practicing or implementing the invention under the claims.

The teachings of the invention(s) provided herein can be applied to other systems, not necessarily the system described above. The elements and acts of the various examples described above can be combined to provide further implementations of the invention(s). Some alternative implementations of the invention may include not only additional elements to those implementations noted above, but also may include fewer elements. Further any specific numbers noted herein are only examples: alternative implementations may employ differing values or ranges.

References throughout the foregoing description to features, advantages, or similar language do not imply that all of the features and advantages that may be realized with the present invention should be or are in any single embodiment of the invention(s). Rather, language referring to the features and advantages is understood to mean that a specific feature, advantage, or characteristic described in connection with an embodiment is included in at least one embodiment of the present invention(s). Thus, discussion of the features and advantages, and similar language, throughout this specification may, but do not necessarily, refer to the same embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Although certain aspects of the invention(s) are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

What is claimed is:

1. A lock system, comprising:
   a base with a first end and a second end;
   a central hinge link configured at the first end of the base;
   two first arms, each of the two first arms including a first end and a second end, the first ends of the two first arms attached to the central hinge link by two respective wing hinges, the two respective wing hinges configured to pivot the two first arms about respective axes;
   wherein the central hinge link is configured to pivot up, away from the base, around an axis perpendicular to the axes of the two wing hinges of the two first arms;
   two second arms, each with a first end and a second end, the first ends of the two second arms attached to the two second ends of the first two arms with respective hinges, the two second arm hinges configured to pivot about axes parallel to the axes of the two wing hinges of the two first arms;
   a two part lock system with one respective component on the second ends of the two second arms, the two part lock system configured to lock together and be unlocked.

2. The system of claim 1 wherein the two part lock system includes an insert lock unit and a receiver lock unit, the insert lock unit attached to the second end of one of the two second arms, the receiver lock unit attached to the second end of the other of the two second arms, wherein the insert lock unit and the receiver lock unit are configured to couple together to lock and unlock.

3. The system of claim 1 wherein the two first arm ends are configured to be able to pivot the first two arms back so the second ends of the first two arms approach the second end of the base forming a compact stowed system.

4. The system of claim 1 wherein the central hinge link includes a central hinge bar, the central hinge bar forming the axis around which the central hinge link pivots about the base.

5. The system of claim 1 wherein the arms and central hinge link are made of steel.

6. The system of claim 1 wherein the arms are generally flat.

7. The system of claim 2 wherein the two part lock system units are each attached to the two second ends of the respective two second arms by a hinge.

8. The system of claim 1 wherein the base is configured to attach to a bicycle frame.

9. The system of claim 4 wherein the base, arms, and central hinge bar are made of steel.

10. The system of claim 4 wherein the base, arms, and central hinge bar are made of titanium.

11. A lock system, comprising:
    a base bar with a top, bottom, first end and second end, the bottom of the base bar including an attachment mechanism, the first end of the base bar including a central link with two wing hinges;
    two link arms, each with a first end and a second end, the respective first ends of the two link arms extending from the two wing hinges;
    wherein the central link includes a central hinge configured to pivot about the base bar about an axis perpendicular to the direction of axes of the two link arm two wing hinges; and
    two lock portions configured at the respective second ends of each of the two link arms, the two lock portions configured to lock and unlock with each another.

12. The system of claim 11 wherein the two link arms each include a second link arm connected to the two link arms, each by a respective hinge configured to allow the two second link arms to pivot about axes parallel to the axes of the two link arm two wing hinges.

13. The system of claim 11 wherein the base attachment mechanism includes two screws configured to attach to a vehicle frame.

14. The system of claim 11 wherein the two lock portions include one male and one female side, wherein the two lock portions are configured to couple together to lock and unlock with a key.

15. The system of claim 11 wherein the base bar, link arms, and central link are made of steel.

16. The system of claim 11 wherein the base bar, link arms, and central link are made of titanium.

* * * * *